United States Patent [19]

Stolle et al.

[11] 4,080,727
[45] Mar. 28, 1978

[54] BATTERY PLATE ENVELOPE MACHINE AND METHOD OF MAKING BATTERY PLATE ENVELOPES

[75] Inventors: William H. Stolle, Belmont; Ralph G. Tiegel, San Carlos, both of Calif.

[73] Assignee: Tiegel Manufacturing Company, Belmont, Calif.

[21] Appl. No.: 788,335

[22] Filed: Apr. 18, 1977

[51] Int. Cl.² ........................................... H01M 2/14
[52] U.S. Cl. ............................... 29/623.4; 29/623.5; 29/730; 156/213; 156/263; 156/264; 156/305; 156/484; 156/521; 156/578
[58] Field of Search ............... 29/623.1, 623.4, 623.5, 29/730, 731; 156/483, 484, 485, 213, 263, 264, 305, 516, 517, 521, 578

[56] References Cited
U.S. PATENT DOCUMENTS

| | | | |
|---|---|---|---|
| 2,373,082 | 4/1945 | Staelin | 29/730 X |
| 2,624,106 | 1/1953 | Lund | 29/730 X |
| 3,892,620 | 7/1975 | Heussy | 156/443 |
| 4,026,000 | 5/1977 | Anderson | 29/623.4 X |

*Primary Examiner*—Carl E. Hall
*Attorney, Agent, or Firm*—Owen, Wickersham & Erickson

[57] ABSTRACT

A method and machine for assembling sheets of battery plate separator material over the battery plates in envelope fashion and sealing the side edges together is disclosed. The machine feeds battery separator material from a storage roll into a folding station, scores a folding line across the sheet and severs the sheet from the roll, in a length double the height of a battery plate. A battery plate is fed bottom end first against the fold line of the separator sheet, and guides in a folding station cause the sheet to fold over and cover both sides of the plate. The plate and separator envelope are engaged between upper and lower conveyors adjacent to the folding station and carried away. Downstream, a pair of lifting devices positioned on either side of the path of travel of the plate and separator lift the upper edge of the overlapping separator envelope on each side, and a switch is tripped to cause a hot melt adhesive to be applied by nozzles to the lower overlapping separator edges. The plate and envelope are then conveyed through pairs of upper and lower rollers on each side of the conveyor to press together and seal the side edges of the envelope together. The sealed edges may then undergo a trimming operation, so that initial positioning and alignment of the separator plate in the fold of the envelope is made less critical.

18 Claims, 10 Drawing Figures

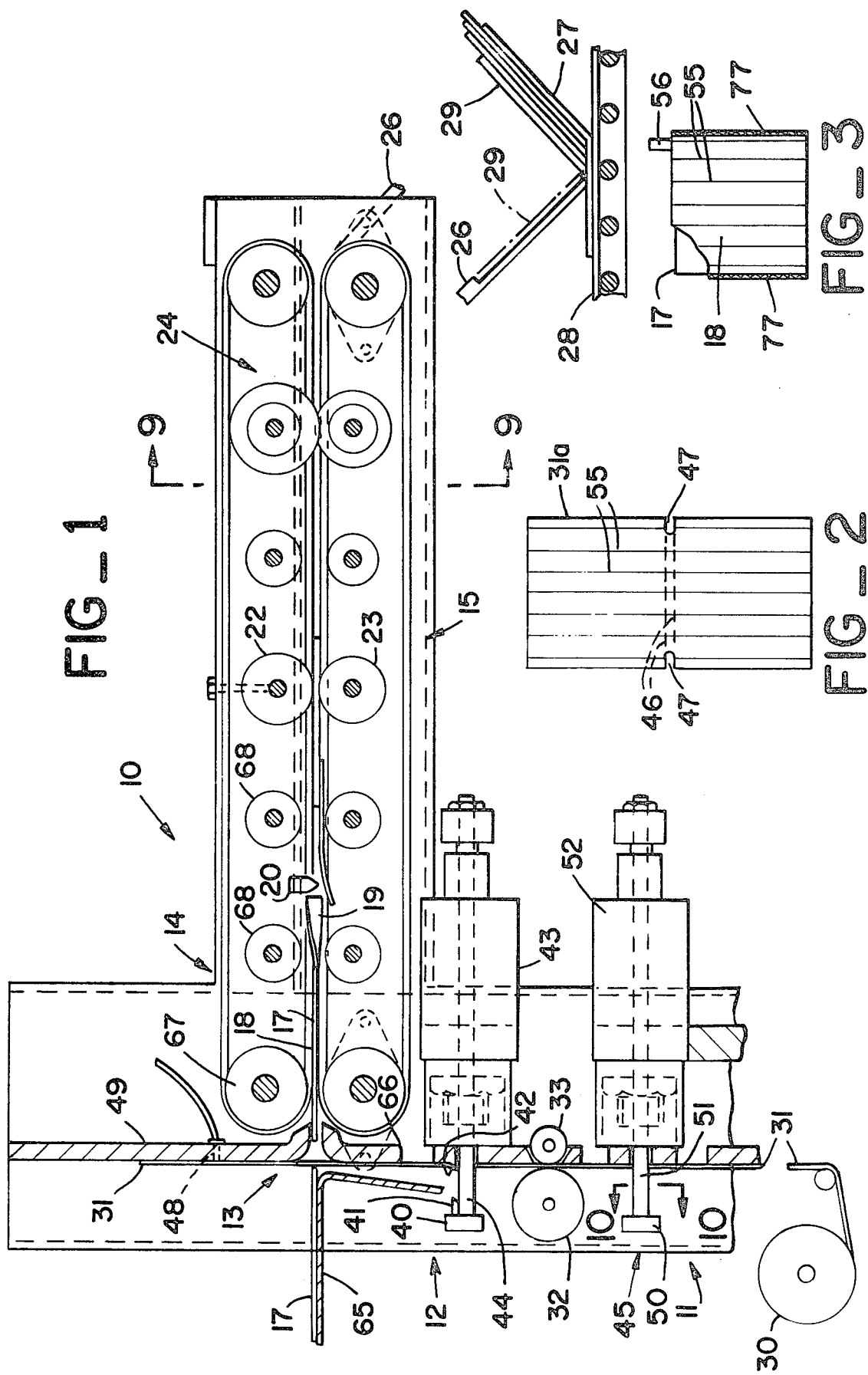

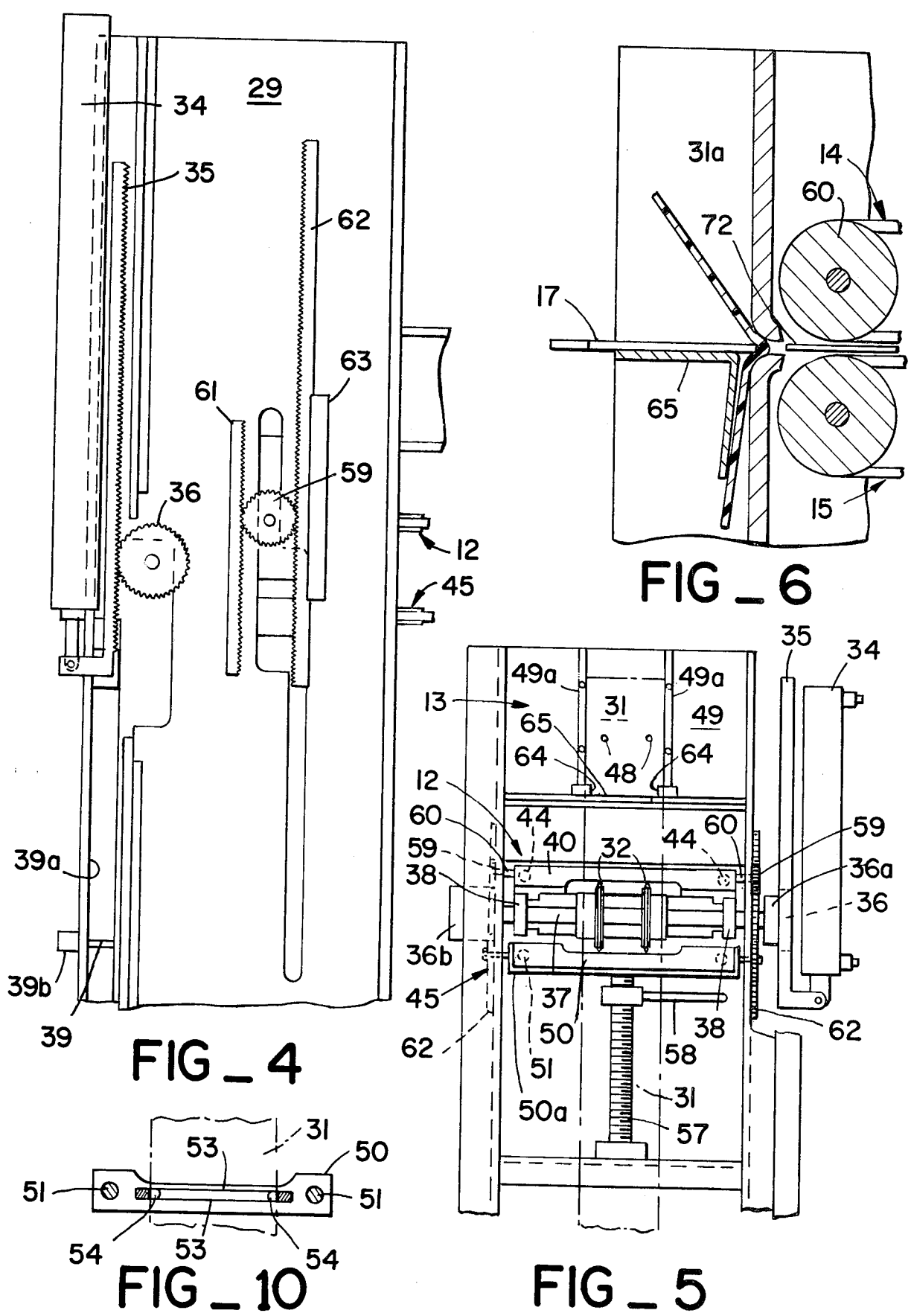

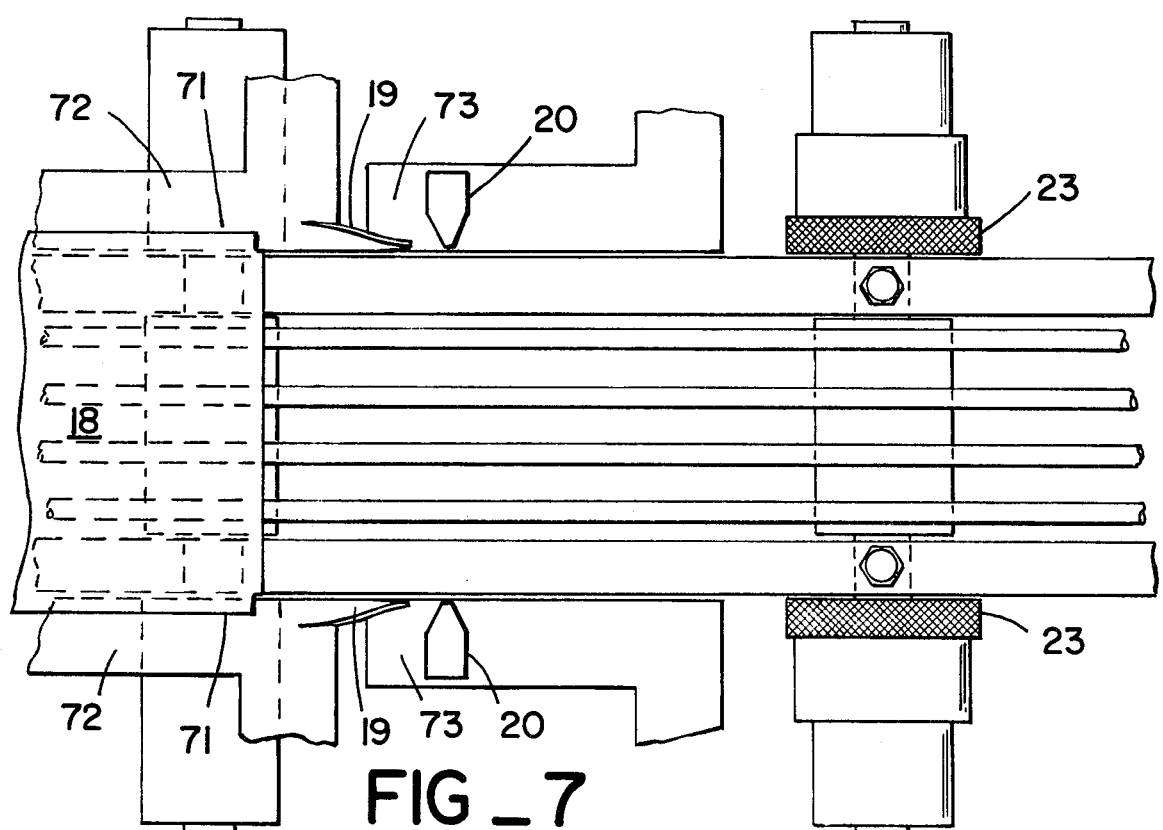
FIG_7
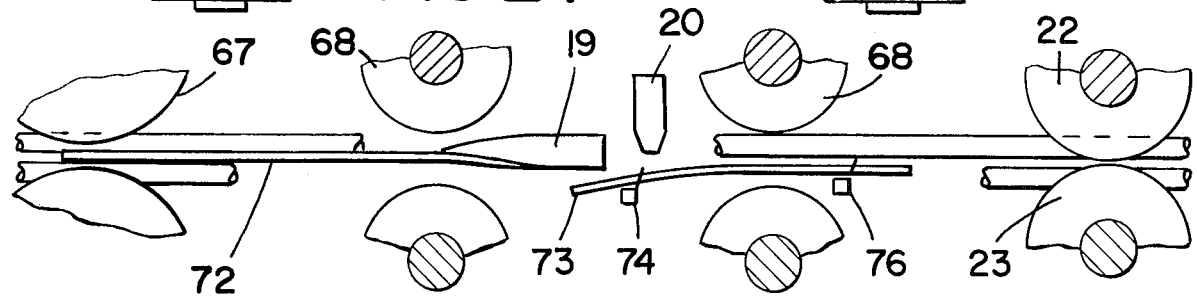
FIG_8
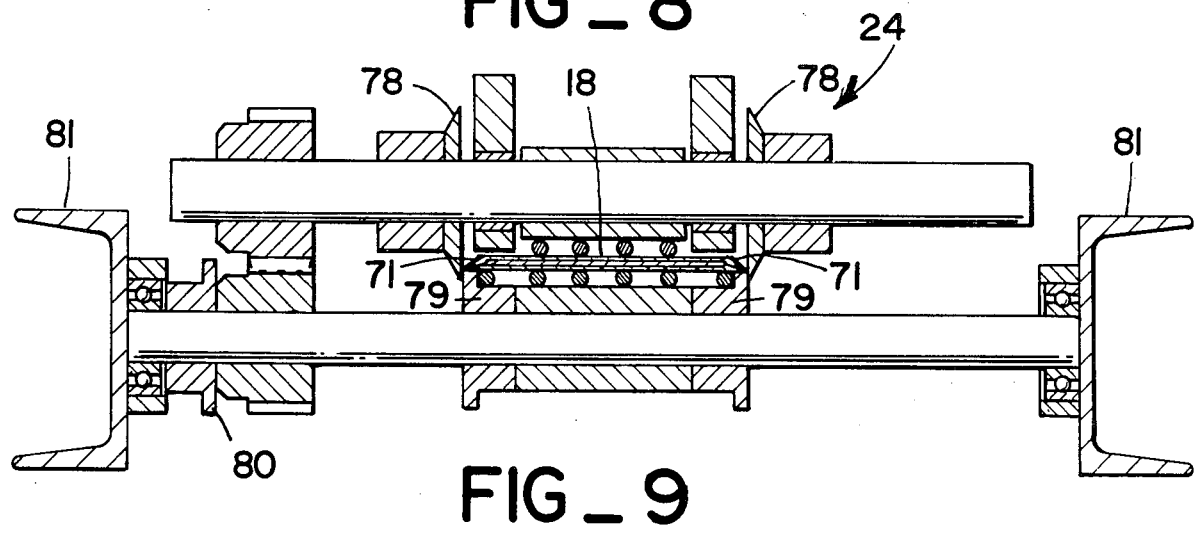
FIG_9

BATTERY PLATE ENVELOPE MACHINE AND METHOD OF MAKING BATTERY PLATE ENVELOPES

BACKGROUND OF THE INVENTION

The invention relates to wet cell storage battery manufacture, and more particularly to an improved method and machine for enveloping battery plates in separator material.

In an automotive type battery it is often desirable to have either the positive or the negative battery plates enclosed within an envelope. In addition to physically separating and insulating the plates, which normally are grids supporting lead oxide or other material, from one another, the envelopes prevent material from falling to the bottom of the battery case as can happen in conventional batteries utilizing sheet-type separators. Such material accumulating in the bottom of the battery case eventually causes shorts to develop, and the life of the battery is shortened. By containing the material from the plates on which they are positioned, the envelope-type separators avoid this problem. They also enable the battery to be somewhat smaller, since space normally provided below the plates for accumulation of sediment may be eliminated.

The material used for the separator envelope varies, but in general it must have some type of rib structure for holding most of its area away from the plate and it must be porous enough so that the acid and the ions can migrate in and out of the envelope from plate to plate.

Although these envelope-type battery plate separators have been in use in the past, particularly in the so-called "maintenance free" batteries, the separator envelopes have not been formed and assembled onto the battery plates in as efficient and economical a manner as that of the present invention described below.

SUMMARY OF THE INVENTION

The present invention is a battery separator envelope assembly method and machine which facilitate fast and efficient enveloping of a battery plate without complex equipment or lengthy time-consuming assembly steps.

According to the method of the invention, the end of a ribbon of separator material from a supply roll is fed toward a folding station. When the ribbon stops in the folding station, it is cut off to the proper length, which is about double the height of a battery plate to be enveloped. Meanwhile, below the folding station a double line is scored across the ribbon of separator material as a folding line for the next separator envelope below that in the folding station. Also, a notch is punched out of each edge of the sheet at the ends of the folding line. The separator sheet in the folding station has already had these operations performed on it, during the previous separator feeding cycle.

With the cut sheet of separator material positioned in the folding station, and retained by guides above and below the folding line, a battery plate is pushed with its bottom edge forward into the sheet against the folding line, thereby folding the sheet over the plate in envelope fashion, until the plate and the sheet are engaged between opposed upper and lower conveyors supported on rollers adjacent to the folding station.

The plate and the folded envelope are conveyed away from the folding station with the fold and the notched edges forward. As they advance, one overlapping edge at each side of the envelope is spread away from the adjacent edge by means of stationary camming lifters positioned at each side of the path of travel of the plate and envelope, so that the notches and envelope edges pass over these lifters. While the overlapping envelope edges are spread apart, a hot melt adhesive is applied to the inside surface of one edge at each side, then the plate and envelope are conveyed through pairs of rollers at the sides of the conveyors, to compress together the adjacent edges before the adhesive has set, thereby sealing the envelope at both sides.

As a further step in the method, the assembled battery separator envelopes may be trimmed at the side edges. This makes initial positioning and alignment of the battery plate within the sheet of separator material less critical, so that the folding operation can be accomplished rapidly and dependably, without complex positioning apparatus.

The battery envelope assembly machine of the invention includes efficient and relatively simple apparatus for accomplishing the method of the invention. The separator material is stored on a roll near the folding station and is of a width somewhat greater than the width of a battery plate. The end of the roll may be advanced into the folding station either from above or below, but in either event, the folding station includes some type of device for holding the cut sheet of material in place prior to insertion of the battery plate.

The ribbon of separator material is advanced toward the folding station by a pair of rollers between which it is engaged. The drive roller of the pair is driven preferably by an air cylinder and a reciprocable rack geared to the roller. The scoring tool, the punch and the cutter for the sheets of separator material are also reciprocating devices. The separator material lies along the edge of a stationary cutter blade, and is severed by a movable blade which engages the stationary blade to shear off a sheet of material.

Adjacent to the folding station, on the opposite side of the separator material from the conveyors, is a feeding platform for the plates, perpendicular to the path of travel of the separator material and in alignment with the conveyors. This orientation is preferably, but not necessarily, horizontal. The battery plates may be fed across the feeding platform into the separator sheet by hand or by any suitable automatic feeding device. The folding station has separator guiding structure both above and below the center fold line of the separator sheet, so that when the plate is pushed into the center of the sheet of material, the sheet is immediately creased and folded over the plate into an envelope, and the plate and envelope together enter the conveyors.

The cam-type separator edge lifters on either side of the path of the advancing battery plate and separator are arcuate twisted blades, so structured to extend under the upper overlapping edges of the separator envelope and lift them away from the adjacent edges so that an adhesive nozzle immediately downstream can apply adhesive to the lower overlapping edge. The edge pressing rollers are located a short distance downstream from the adhesive nozzle, so that each edge is pressed and sealed together immediately after the hot melt adhesive has been applied, before it has had a chance to set.

The separator assembly machine of the invention is fully adjustable to accommodate battery plates of various heights and widths. The cutter assembly and the scoring and punching assembly are so mounted and geared together that when they are raised or lowered to adjust the positions of cutting, scoring and punching, the scoring and punching device automatically is adjusted by twice the amount of the cutting assembly.

It is therefore among the objects of the invention to provide a method and apparatus for assembling envelope-type battery separator sheets onto variously sized battery plates rapidly, efficiently and dependably, and avoiding the use of complex steps and equipment. These and other objects of the invention will be apparent from the following description of a preferred embodiment of the invention, taken in conjunction with the accompanying drawings.

DESCRIPTION OF THE DRAWINGS

FIG. 1 is an elevation view in section of a battery plate separator assembly machine according to the invention;

FIG. 2 is a view of a separator envelope after punching, scoring and cutting from the roll;

FIG. 3 is a partially broken-away view showing a battery plate with an assembled separator envelope;

FIG. 4 is a view in side elevation showing some of the components of a separator material feeding system and of a means for adjusting the machine for different envelope sizes, with some parts removed for clarity;

FIG. 5 is an elevational view of the upstream end of the machine, showing parts of the feeding, cutting, scoring and punching apparatus;

FIG. 6 is a detail view in sectioned side elevation showing the folding station, wherein battery plates are fed against the mid-point of the sheet of separator material;

FIG. 7 is a plan view of a portion of the machine;

FIG. 8 is an elevational view showing in longitudinal section apparatus for applying adhesive to the separator edges;

FIG. 9 is a sectional elevational view taken along the line 9—9 of FIG. 1, indicating a battery plate and separator envelope being trimmed by a slitter device; and FIG. 10 is a detail view taken along the line 10—10 of FIG. 1.

DESCRIPTION OF THE PREFERRED EMBODIMENT

In the drawings, FIG. 1 shows somewhat schematically and in sectional elevation a battery separator assembly machine 10 including a separator material feeding system generally identified by the reference number 11, a cutting device generally identified as 12, a separator sheet folding station identified generally as 13, a pair of upper and lower adjacent conveyors identified as 14 and 15, respectively, for conveying a battery plate 17 and separator envelope 18, a pair of envelope edge lifters 19, hot melt adhesive applying nozzles 20, and edge pressing rollers 22 and 23. In addition, the machine 10 may include a separator envelope edge trimmer 24 comprising slitter type rotary cutting apparatus on each side of the conveyors 14 and 15. Assembled battery plates and envelopes are delivered from the downstream end of the conveyors 14 and 15 onto a receiving platform 26, from which they may be removed by hand or by a stacking storage device at the lower end of the platform 26, which may be inclined as shown. Such an apparatus, as illustrated in FIG. 1, may include a storage tray 27 resting on a roller conveyor 28, and a pivoted stacker 29 at the bottom of the platform 26. Provision is made for the stacker 29 to lie flush with the surface of the platform 26 as shown in dashed lines, when it is pivoted into a storage position. As each enveloped plate slides down the platform to the tray 27, the stacker 29 may be flipped up to stack the plate and envelope with others in the tray, causing the tray to advance slightly on the roller conveyor 28. The flip-up and return motion of the stacker 29 may be by automatic means (not shown) responsive to the movement of the enveloped plate down the platform 26.

The separator material feeding system 11 includes a supply roll 30, which stores a ribbon of separator material 31 of slightly greater width than that of the battery plates 17, and a pair of feeding rollers 32 and 33 which engage the ribbon of material 31 between them to incrementally meter the ribbon upwardly into the folding station 13 as required. One of the rollers 32 and 33 is driven during separator advancement, preferably the roller 32, while the other roller is spring-biased toward the driven roller. The driven roller 32 may be incrementally driven by, for example, an adjustable pneumatic cylinder apparatus as shown in FIG. 4.

As FIGS. 4 and 5 indicate, the pneumatic cylinder 34 is mounted vertically on a right side frame member 29 of the machine, and is connected to drive downwardly and return a rack 35 of gear teeth. The cylinder may be double acting or with a spring return. The rack 35 is engaged with a gear 36 which is connected to a shaft 37 driving the roller or rollers 32. A one-way clutch 36a connecting the gear 36 to the shaft 37 provides for drive in one direction only, and the retraction of the rack 35 has no effect on the separator drive rollers 32. The entire shaft, as well as the idler roller 33 beyond, is connected by bearing blocks 38 to the cutter assembly 12, so that all of the separator feeding apparatus except for the cylinder 34 and rack 35 move up or down with the cutting assembly when vertical adjustment of the cutting assembly (and the scoring and punching assembly) is made. A brake 36b may be connected to the shaft to apply a constant, light friction to the shaft and prevent its overriding when the rack 35 reaches the end of its stroke. The brake is, of course, allowed to move up or down with the shaft 37 and is not rigidly connected to the machine frame. It only co acts with the frame so far as to prevent its own rotation.

The end of the stroke of the cylinder 34 and rack 35 is determined by the position of a stop 39 at the bottom of a track 39a which guides the rack in its movement (see FIG. 4). Whenever the scoring and punching assembly 45 and the cutting assembly 12 (and thus the shaft 37) are adjusted, the vertical position of the stop 39 must be accordingly adjusted, so that the proper amount of separator material is fed into the folding station 13. This also adjusts the position of a limit switch 39b associated with the stop and operable to activate the cutting device and the scoring and punching device at the end of the stroke, and also operable to cause the return of the cylinder and rack. The adjustment of the cutting assembly and the scoring and punching assembly will be discussed further below.

Prior to the cutting of a sheet of separator material from the ribbon 31 extending from the supply roll 30, the ribbon 31 is advanced into the folding station 13 sufficiently that it extends above the awaiting battery plate 17 by a distance equal to or slightly greater than the height of the battery plate 17 (horizontal dimension as viewed in FIG. 1).

The cutting assembly 12 is positioned below the awaiting battery plate 17 about the same distance that the end of the separator ribbon 31 extends above the plate, so that when folded, the separator envelope 18 will cover both sides of the plate. Included in the cutting assembly 12 are a movable support block 40 supporting a shear blade 41 which travels into contact with a stationary shearing blade 42 to shear off a sheet of separator material 31a from the ribbon 31. Suitable conventional apparatus, preferably including a pneumatic cylinder 43 shown in FIG. 1 and forming a part of the cutter assembly 12, is connected to the movable block 40 to draw it forward, then return it, upon receipt of a signal from the limit switch 39b indicating that the ribbon 31 has been advanced into the desired position in the folding station 13.

As indicated in FIGS. 1 and 5, the cutter support block 40 extends from a pair of slidable shafts 44 connected ultimately to the pneumatic cylinder 43. The ribbon 31 of separator material (dashed lines in FIG. 5) passes between the shafts 44. As discussed above, the cutting assembly 12 also supports the feed rollers 32 and 33 and a part of their drive mechanism. The manner in which the vertically adjustable cutting assembly is itself supported will be explained below.

Following cutting, the cut sheet of separator material 31a is held in place in the folding station by any suitable holding device. This may comprise, for example, one or more suction openings 48 in a plate 49 forming a part of the folding station 13. The openings 48 are connected at the downstream side of the plate 49, through suitable conduits, to a source of vacuum. This draws the cut sheet against the plate 49 to prevent it from falling. A shelf means (not shown) can alternatively be provided in association with the stationary cutting blade 42, to catch and hold the bottom of the sheet after cutting.

While the cutting assembly 12 shears off a sheet of separator material, a scoring and punching assembly 45 below scores a folding line, preferably a double folding line as shown in FIG. 2, horizontally across the ribbon 31 at the point which will be the middle of the next sheet 31a to be cut. This device also punches out a notch 47 at each edge of the sheet 43, so that the folded envelope 18 riding in the conveyors 14 and 15 can pass through the edge lifters 19. This operation and the lifters 19 will be explained further below.

As indicated in FIGS. 1 and 5, the scoring and punching assembly 45 includes a support block 50 extending from a pair of slideable shafts 51 connected ultimately to a driving means such as a pneumatic cylinder 52. This assembly is similar to the cutting assembly 12, except that the support block 50 has on its face (opposite of face seen in FIG. 5) a pair of ridges 53 and punches 54 at the ends of the ridges, as shown in FIG. 10. When the support block 50 is drawn inwardly by the cylinder 52 and shafts 51, the ridges 53 co act with a plate 50a (see FIG. 5) of the assembly 45 to pinch the ribbon of separator material 31 therebetween and score a pair of indentations 46, referred to above as a double folding line 46. The plate 55 has a pair of dies (not shown) in which the outer edges of the punches 54 slide and in conjunction with which the punches punch out the notches 47 in the edges of the ribbon of material. The ribbon 31 is shown in dashed lines in FIG. 10.

For width adjustment, the punches 54 and ridges 53 are on removable plates (not separately illustrated) of the block 50, so that they can be replaced easily. Similarly, the die plate (not shown) of the plate 55 is replaceable.

FIGS. 2 and 3 show a cut sheet of separator material 31a and an assembled envelope 18 on a battery plate 17, respectively. The sheet includes standoff ribs 55, which may be corrugations or ridges in the sheet, for spacing the envelope away from the battery plate faces so that acid and ion migration is not hindered. The separator material may be any suitable plastic, such as polyethylene. The battery plate itself is usually a lead grid for supporting a charge of lead oxide, with a connector lug 56 extending upwardly from one side.

As illustrated in FIG. 5, the scoring and punching assembly 45 is supported by a threaded rod 57 connected to the frame of the machine and effective when rotated to raise or lower the assembly 45. A crank arm 58 is provided for rotation of the rod.

The cutting assembly 12 is connected to and supports the scoring and punching assembly 45 by means of gearing which causes the height of the cutting assembly to be adjusted by twice that of the scoring and punching assembly. Illustrated in FIGS. 4 and 5, this gearing includes a pair of gears 59 on shafts 60 extending through the machine frame from the cutting assembly, the gears 59 being in engagement with a fixed rack 61 on the frame and a vertically movable rack 62 which slides in a guide 63 mounted to the machine frame (the fixed rack 61 is removed for clarity in FIG. 5). The lower end of the rack 62 is connected to the scoring and punching assembly 45. Thus, when the assembly 45 is lowered, for example, the movable racks 62 on either side of the machine are lowered with it. This brings the cutting assembly 12 down by half the amount of the scoring and punching assembly, since the supporting gears 59 walk along the fixed rack 61.

At the folding station 13, the battery plates 17 may be fed into the sheet of separator material by hand or by a suitable automatic feeder, as by opposed conveyors or rollers (not shown). For hand feeding a folding platform 65 is provided just upstream of the sheet of separator material and in alignment with the conveyors downstream, so that a plate 17 can be fed bottom first into the cut sheet 31a by sliding it along the platform 65. For guiding the sheet 31a into the desired envelope configuration, guides are positioned above and below the center of the sheet, the upper guide being formed by the plate 49 and the lower guide being identified as 66. As best seen in FIG. 5, guides 64 for the battery plates are mounted on the folding platform 65, while more widely spaced separator sheet guides 49a are mounted on the plate 49. Both sets of guides are adjustable in width spacing. As can be envisioned from FIG. 1, the sheet creases along the double fold line and begins to fold over and conform to the surfaces of the plate as it is drawn between the guides 49 and 66. When the folded envelope reaches the upstream end of the conveyors 14 and 15, it is pulled into them and advanced along without the need of further feeding by the operator or automatic feeder.

Upstream rollers 67 and 68 of the upper conveyor 14 are adjustable as to height and clearance from their counterparts immediately below, so that the pinch pressure on the advancing plates and envelopes, prior to edge sealing, is adjustable.

The adhesive applying operation and apparatus are best understood with reference to FIG. 1, the plan view of FIG. 7 and the sectional view of FIG. 8. Upper and lower edges 71 (see FIG. 7—lower edge not visible) of the folded separator envelope 18 overlap the plate on each side. At each side of the conveyors, intruding into the path of travel of the envelopes but not reaching the plates, are the envelope edge lifters 19, comprising thin plates which are twisted and undergo a transition in orientation through their length from horizontal to vertical. Their upstream ends are continuous with a thin horizontal plate 72 which extends back upstream to the folding station. As can be envisioned from FIG. 6, showing the upstream end of one plate 72, the envelope as initially folded over the battery plate 17 slides via its notches 47 over the plate 72, and the upper and lower overlapping envelope edges 71 ride along the plates 72 until they reach the twisted lifters 19. There the upper envelope edges are deflected upwardly, spreading the edges apart at each side of the envelope.

The hot melt adhesive nozzles 20 are immediately downstream of the edge lifters 19, so that the adhesive can be applied to the inside surfaces of the lower edges before the upper edges have a chance to spring back down. Inclined back-up surfaces 73 are positioned just below the nozzles so that the dispensed adhesive does not push the envelope edge too far downwardly.

As discussed above, the hot melt adhesive is dispensed through the nozzles 20 by apparatus including conventional electric circuitry which includes a pair of limit switches 74 and 76 positioned to be tripped by the leading edge of the separator envelope. The first limit switch 74 is located closely adjacent to the point where the envelope reaches the nozzles so that the flow of adhesive starts as the leading edge reaches the nozzles. The second switch 76 stops the dispensing of adhesive when tripped by the leading edge of the envelope. Both switches 74 and 76 are mounted on a rail (not shown) which permits individual adjustment of the switch positions. Thus, precision control of the nozzles can be achieved and any plate and envelope height can be accomodated.

A short distance downstream of the hot melt adhesive nozzles are the pairs of upper and lower pressure rollers 22 and 23. The upper rollers 22 are spring loaded against the lower rollers 23 so that a controlled pressure can be applied to the overlapping envelope edges. Either the upper or the lower rollers are driven so that the envelope is positively moved through this pressing operation. The rollers may be knurled to provide a knurled, very well-bonded seal area 77 at each edge of the envelope, as shown in FIG. 3. As can be seen in FIG. 7, the rollers 22 and 23 are positioned to pass closely by the plate 17 itself, so as to engage the overlapping envelope edges 71 beyond the edges of the plate.

The proximity of the sets of pressure rollers 22 and 23 to the hot melt adhesive application, both in distance and in elapsed time, enables the edges to be sealed together before the quickly setting adhesive has time to set. By contrast, in many processes using this type adhesive, it must be applied to the surface to be bonded, then later re-melted to enable it to be bonded to the other surface.

The separator envelope assembly process and machine of the invention may also include an edge trimming operation just upstream of the exit from the conveyors. This operation is embodied in the slitter apparatus 24, best seen in FIG. 9, which may comprise powered, sharp-edged upper rotary blades 78 in shearing engagement with the edges of powered rotors 79. The upper blades 78 and lower rotor wheels 79 are geared together as shown and may be powered via a sprocket 80. Side rails 81 at either side of the machine are also visible in FIG. 9. The wheels 78 and 79 are adjustable in their positions on shafts 82 and 83 to accommodate different widths.

The slitters trim off any envelope edge material which would extend beyond them, leaving an envelope of straight edges and uniform width. This enables the use of less precision in the folding of the separator sheets over the plates, so that complex and time-consuming aligning mechanism and steps are avoided, and also trims off any excess adhesive which might ooze out of the edges during sealing.

The plate envelope assembly machine 10 of the invention is fully adjustable to accommodate a wide range of battery plate heights and widths. In addition to the adjustment apparatus described, all other components of the separator feeding apparatus, the folding station, the adhesive applying system and the pressure rollers are mounted to be fully adjustable.

In this description the terms "up", "down", "above", "below", etc., are used for convenience in reference to the drawing; the machine 10 need not be oriented as shown, and these terms are not intended to be limiting.

The above described preferred embodiment provides a battery plate separator envelope assembly method and machine which quickly and efficiently folds and seals battery plates without complex or expensive apparatus or operations. Various other embodiments and changes to this preferred embodiment will be apparent to those skilled in the art and may be made without departing from the spirit and scope of the following claims.

We claim:

1. A method for assembling a battery plate separator envelope onto a battery plate, comprising:
   feeding a sheet of separator material of a width greater than that of a battery plate, from a supply roll toward a folding station;
   scoring a folding line across the sheet, perpendicular to the length of the sheet;
   punching out a notch in each edge of the sheet at the ends of the folding line;
   positioning the sheet in the folding station;
   cutting the sheet from the roll such that the folding line is at the approximate center of the sheet;
   pushing a battery plate with its bottom edge forward into the sheet against the folding line until the plate and the sheet are engaged between opposed conveyors supported on rollers adjacent to the folding station, thereby folding the sheet into an envelope about the plate with edges overlapping the plate on both sides;
   continuing to convey the plate and envelope away from the folding station with the fold and the notched edges forward;
   spreading one edge at each side of the envelope away from the adjacent edge using stationary lifters positioned at each side of the path of travel of the plate and envelope, so that notches and envelope edges pass the lifters;
   while the envelope edges are spread, applying a hot melt adhesive to the inside surface of one edge at each side of the envelope; and
   compressing the adjacent edges together at each side of the envelope before the adhesive has set, thereby sealing the envelope at both sides.

2. The method of claim 1 which further includes the step of trimming the sealed edges as the plate and envelope advance between the conveyors.

3. A battery envelope assembly machine for covering a battery plate with a separator envelope closed on three sides and open at the top, comprising:
- a frame;
- a roll of separator material mounted on the frame and having a width somewhat greater than the width of a battery plate;
- a folding station on the frame, having means for retaining a sheet of separator material;
- means for feeding a ribbon of separator material from the roll into the folding station;
- means for scoring a folding line across the ribbon, perpendicular to the length of the ribbon,
- means for cutting a sheet of separator material from the ribbon such that the folding line lies at the approximate center of the sheet;
- a battery plate feed table mounted on the frame on one side of the plane of the separator sheet;
- a pair of opposed endless conveyors connected to the frame on the opposite side of the separator sheet, having reaches closely adjacent one another and supported by rollers adjacent to the folding station, and means for driving the conveyors so that said adjacent reaches travel away from the folding station, whereby a battery plate may be fed bottom first into the folding line of the separator sheet and advanced between the conveyor rollers, so that the plate and folded separator envelope are then advanced with the adjacent reaches of the conveyors;
- means along the path of travel of the plate and envelope for spreading one of the adjacent separator edges away from the other at each side of the envelope;
- means along the path of travel for applying an adhesive to the inside surface of one of said adjacent edges at each side of the envelope while said edges are spread apart; and
- means along the path for pressing together and sealing said adjacent edges before the adhesive has set.

4. The apparatus of claim 3 which further includes means along the path of travel for trimming the sealed separator envelope edges to establish a uniform predetermined width of the envelope.

5. The apparatus of claim 3 which further includes means associated with said scoring means for punching out a notch in the sheet of material at each end of the folding line, and wherein said spreading means includes, at each side of the path of travel of the plate and separator envelope, a projection positioned to pass between the adjacent edges of the envelope at the notch, said projection being of a twisted shape progressing from a flat orientation parallel to the envelope to an orientation perpendicular to the envelope, to spread one separator edge away from the other.

6. The apparatus of claim 3 which further includes means associated with said scoring means and said cutting means for adjusting the distance of the cutting means from the plane of the feed table while simultaneously adjusting the distance of the scoring means from the feed table by twice the amount of the cutting means adjustment, so that battery plates of varying heights can be accommodated.

7. The apparatus of claim 6 wherein said adjusting means comprises:
- a scoring assembly including said scoring means, said assembly being movable toward and away from the battery plate feed table, said ribbon of separator material being arranged generally planarly from the scoring assembly to the feed table;
- means connected to the frame for supporting the scoring assembly and for adjusting the spacing of the assembly from the battery plate feed table;
- at least one rack connected to the scoring assembly and extending parallel to the ribbon of separator material;
- a cutting assembly including said cutting means, said cutting assembly being movable toward and away from the battery plate feed table and being positioned between the scoring assembly and the feed table;
- a gear in meshed engagement with the rack and rotationally supported on the cutting assembly; and
- a fixed rack extending parallel to said one rack, in meshed engagement with said gear and positioned opposite said one rack, said fixed rack being affixed to the frame;
- whereby, when the distance of the scoring assembly from the feed table is adjusted, the distance of the cutting assembly from the feed table is adjusted by half the amount of the scoring assembly adjustment.

8. The apparatus of claim 7 wherein said means connected to the frame and supporting the scoring assembly includes a screw-threaded rod effective when rotated to adjust the position of the scoring assembly.

9. The apparatus of claim 3 wherein said separator material feeding means comprises a pair of rollers on opposite sides of the separator material engaging the material between them, and adjustable metered drive means connected to one of the rollers for feeding the appropriate length of separator material into the folding station.

10. The apparatus of claim 9 wherein said adjustable metered drive means includes a drive gear connected to said one roller by a one-way clutch such that the drive gear is effective to drive the roller only in the feeding direction of the separator ribbon, a rack in meshed engagement with the gear, and a reciprocable drive means connected to the rack and to the machine frame for extending the rack in one direction, then retracting it, the stroke length of said rack being determined by an adjustable stop connected to the machine frame.

11. The apparatus of claim 10 which further includes a brake applying a resistance to the movement of said one roller in the feeding direction, to prevent override of the roller at the end of the rack stroke.

12. The apparatus of claim 10 wherein said reciprocable drive means is a double-acting pneumatic cylinder, and wherein a limit switch adjacent to said adjustable stop is operably connected to cause the cylinder to retract the rack when tripped.

13. The apparatus of claim 12 wherein said limit switch is also operably connected to actuate the scoring means and the cutting means when tripped, whereby the scoring and cutting operations are performed on the ribbon of separator material shortly after the feeding operation.

14. The apparatus of claim 3 wherein the scoring means comprises a first plate having a pair of parallel ridges, a second, flat-surfaced plate on the opposite side of the ribbon of separator material from the first plate, and means for drawing the first plate toward the second plate to pinch the ribbon of separator material therebetween and score a double folding line across the ribbon.

15. The apparatus of claim 14 wherein said drawing means includes a pneumatic cylinder, said apparatus further including means effective to actuate the pneumatic cylinder in response to the feeding of the ribbon of separator material by said feeding means into the folding station.

16. The apparatus of claim 15 wherein said cutting means is operated by a pneumatic cylinder also actuated in response to the feeding of the ribbon of separator material.

17. The apparatus of claim 3 wherein said means for applying adhesive includes adhesive nozzles positioned adjacent to the spreading means, and limit switches positioned in the path of travel of the separator envelope and operably connected to the nozzles and effective to start the dispensing of adhesive as the front separator edge approaches the nozzles and to stop the flow of adhesive as the trailing edge passes.

18. The apparatus of claim 17 which further includes means operably connecting the separator material feeding means to one of said limit switches for actuating the feeding means in response to the advancement of the separator to the limit switch.

* * * * *